United States Patent
Ohta et al.

(10) Patent No.: US 7,904,549 B2
(45) Date of Patent: Mar. 8, 2011

(54) PERFORMANCE INFORMATION COLLECTION METHOD, APPARATUS AND RECORDING MEDIUM

(75) Inventors: Kouji Ohta, Kawasaki (JP); Hui Li, Kawasaki (JP); Kunihiro Adachi, Kawasaki (JP); Saeko Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 932 days.

(21) Appl. No.: 11/454,455

(22) Filed: Jun. 16, 2006

(65) Prior Publication Data

US 2007/0220139 A1 Sep. 20, 2007

(30) Foreign Application Priority Data

Mar. 20, 2006 (JP) ................................. 2006-077151

(51) Int. Cl.
*G06F 15/16* (2006.01)
(52) U.S. Cl. ........................................ 709/224; 709/200
(58) Field of Classification Search .................. 709/225, 709/226, 223, 200–202, 224
See application file for complete search history.

(56) References Cited

U.S. PATENT DOCUMENTS

| | | | | |
|---|---|---|---|---|
| 6,003,079 A * | 12/1999 | Friedrich et al. | ............... | 709/224 |
| 6,807,575 B1 * | 10/2004 | Emaru et al. | .................. | 709/224 |
| 6,873,934 B1 * | 3/2005 | Rodrigues et al. | ............ | 702/186 |
| 6,892,236 B1 * | 5/2005 | Conrad et al. | ................ | 709/224 |
| 7,512,680 B2 * | 3/2009 | Nishikawa et al. | ............ | 709/224 |
| 2002/0019844 A1 * | 2/2002 | Kurowski et al. | ............. | 709/201 |
| 2003/0115244 A1 * | 6/2003 | Molloy et al. | ................. | 709/105 |
| 2006/0116146 A1 * | 6/2006 | Herrod et al. | .................. | 455/515 |
| 2007/0288633 A1 * | 12/2007 | Mullarkey | ..................... | 709/224 |
| 2008/0098454 A1 * | 4/2008 | Toh | .................................... | 726/1 |
| 2009/0157699 A1 * | 6/2009 | Ohata et al. | ..................... | 707/10 |

FOREIGN PATENT DOCUMENTS

| | | |
|---|---|---|
| JP | 2000-122943 A | 4/2000 |
| JP | 2001-75836 A | 3/2001 |
| JP | 2001-77813 A | 3/2001 |
| JP | 2002-44080 A | 2/2002 |
| JP | 2002-152204 A | 5/2002 |
| JP | 2004-178118 A | 6/2004 |
| JP | 2004-318474 A | 11/2004 |
| JP | 2005-004336 | 1/2005 |
| JP | 2005-251048 A | 9/2005 |
| JP | 2005-316808 A | 11/2005 |

OTHER PUBLICATIONS

"Japanese Office Action" mailed by JPO and corresponding to Japanese application No. 2006-077151 on Jun. 15, 2010, with partial English translation.

* cited by examiner

*Primary Examiner* — Moustafa M Meky
(74) *Attorney, Agent, or Firm* — Fujitsu Patent Center

(57) ABSTRACT

In order to collect performance information of a computer capable of executing more than one application software, collection information indicating a timing at which the performance information is to be collected is prepared by the unit of application software. This collects the performance information by referring to the collection information corresponding to the application software currently being executed by the computer. Such a manner collects the performance information at an appropriate timing suitable to the application software currently being executed.

5 Claims, 5 Drawing Sheets

PERFORMANCE INFORMATION COLLECTION POLICY

[APPLICATION 1 : ITEM A]
CONDITION : CPU<20%, SAMPLING INTERVAL=100 TRANSACTIONS
CONDITION : CPU>=20%, SAMPLING INTERVAL=1000 TRANSACTIONS

[APPLICATION 2 : ITEM A]
CONDITION : DISK<60%, SAMPLING INTERVAL=100 TRANSACTIONS
CONDITION : DISK>=60%, SAMPLING INTERVAL=1 TRANSACTION

[APPLICATION 3 : ITEM A]
CONDITION : CPU<20%, SAMPLING INTERVAL=5 MINUTES
CONDITION : CPU>=20%, SAMPLING INTERVAL=10 MINUTES

[APPLICATION 4 : ITEM A]
CONDITION : THE NUMBER OF TRANSACTIONS<10 TIMES/MIN.,
            SAMPLING INTERVAL=1 TRANSACTION
CONDITION : THE NUMBER OF TRANSACTIONS>=10 TIMES/MIN.,
            SAMPLING INTERVAL=10 TRANSACTIONS

FIG. 2

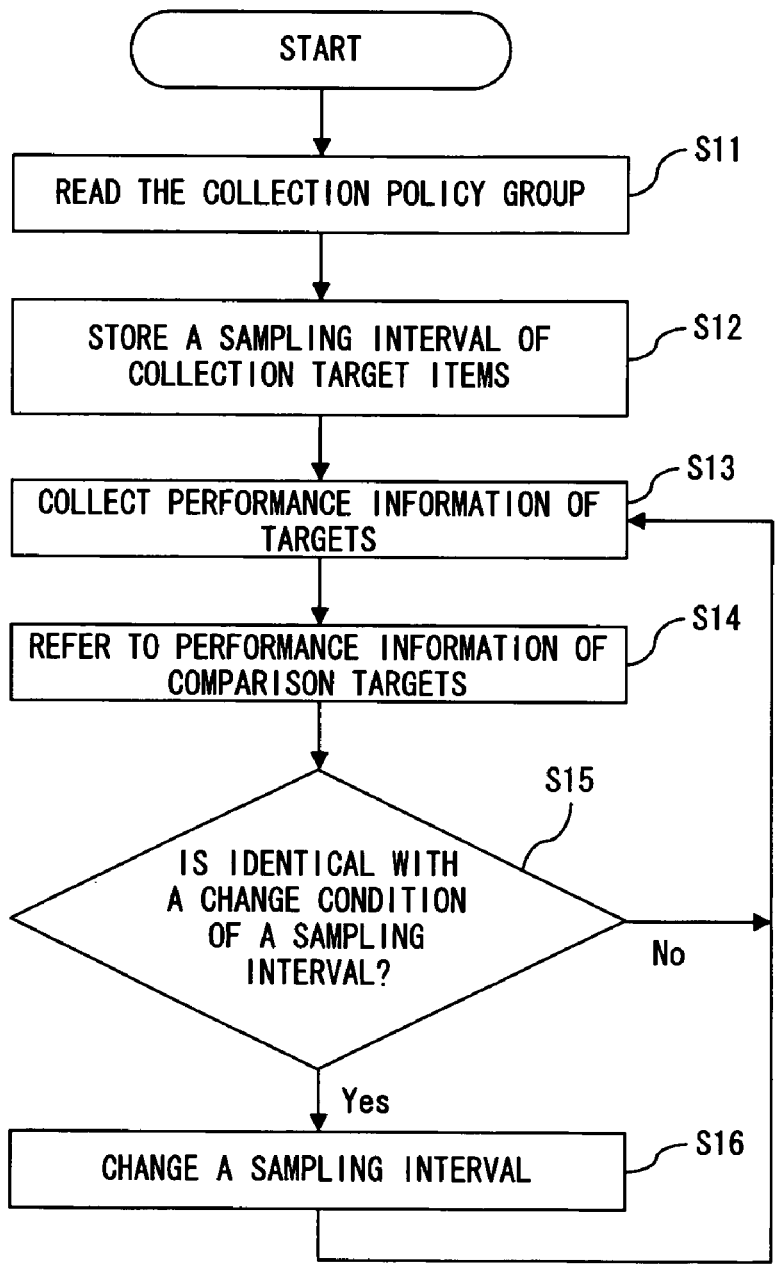
F I G. 4

PERFORMANCE INFORMATION COLLECTION METHOD, APPARATUS AND RECORDING MEDIUM

BACKGROUND OF THE INVENTION

1. Field of the Invention

The present invention relates to a technique for collecting performance information of a computer capable of executing more than one application software.

2. Description of the Related Art

Owing to a recent advance of telecommunication networks, a system for providing many people with a service is usually built in a server. The system includes a business system for supporting a business in a business enterprise for example. A system for providing a service for general users are usually built in a server provided on a Web site.

An important provision of a service is a capability of appropriately providing it. Accordingly, the actual practices include a collection of information indicating a usage condition of resources possessed by a server (e.g., a computer), as performance information, and a monitoring of it, in order to maintain a quality of service. The collection and monitor of the performance information makes it possible to respond so as to make the service available continuously and comfortably. The performance information includes a CPU usage rate, a memory usage volume and a disk usage space for example.

The performance information has conventionally been collected at a predetermined fixed time interval so as to prevent a data volume obtained by the collection from becoming enormous. The collection of data at a predetermined fixed time interval, however, is faced with a possibility of not being able to collect performance information at the time of a condition affecting a quality of service. Such a possibility is reduced by shortening such a predetermined fixed time interval. Shortening the time interval, however, proportionately increases a load required for the collection of the performance information, resulting in degrading performance of a server. Because of this, some of conventional performance information collection apparatuses are configured to change a time interval (or timing) for collecting performance information dynamically according to a resource usage condition as the one noted in a Laid-Open Japanese Patent Application Publication No. 2005-4336. A dynamic change of the time interval makes it possible to collect the performance information by shortening the time interval in a condition requiring the collection of the performance information at a shorter time interval.

A reduction of a quality of service usually occurs under a condition of a high resource usage rate. Consequently, the conventional performance information collection apparatus noted in the Laid-Open Japanese Patent Application Publication No. 2005-4336 is configured to collect performance information at a shorter time interval as a resource usage rate increases. Shortening the time interval, however, corresponds to increasing a load required for collecting the performance information under the condition of a heavy load. In consideration of this, the conventional performance information collection apparatus noted in the Laid-Open Japanese Patent Application Publication No. 2005-4336 is configured to select a kind of performance information which makes a collection time interval longer from among the target performance information, thereby suppressing an increase of a load required for collecting the performance information under such a condition.

As described above, an expansion of a collection time interval increases a possibility of being unable to collect the necessary performance information. The load required for collecting the performance information had desirably better not affect a quality of service. Because of this, it is conceptually important to carryout the collection of performance information from a view point other than a resource usage rate.

The buildup of a system in a server is accomplished by developing application software (simply "application" hereinafter), that is, a program to be executed by a computer used as a server, and making the application executable, regardless of a kind of the system. This is transparent to a configuration of whether or not connecting a plurality of servers by way of a telecommunication network. A common Web site is configured to connect a plurality of servers.

A resource required for carrying out an application differs with application. Also, the execution frequency or the importance differs with application. Such differences exist between applications. Because of this, the collection of performance information by focusing on an application is also considered to be important.

SUMMARY OF THE INVENTION

The purpose of the present invention is to provide a technique for collecting performance information of a computer, which is capable of executing an application, by focusing on the application executed by the computer.

A performance information collection method according to the present invention is a method for collecting performance information of a computer capable of executing more than one application software comprising: preparing collection information, by the unit of application software, indicating a timing at which performance information is to be collected; and collecting the performance information based on collection information corresponding to application software currently being executed by the computer.

Note that a timing for collecting the above described collection information by the unit of application software is desirably changed dynamically according to a usage condition of a resource by preparing more than one the collection information per the usage condition of a resource possessed by the computer. It is also desirable to collect performance information according to a predetermined fixed timing.

A performance information collection apparatus according to the present invention, premising a collection of performance information of a computer capable of executing more than one application software comprises a performance information obtainment unit for obtaining the performance information; a collection information obtainment unit for obtaining collection information, which is prepared by the unit of the application software, indicating a timing at which the performance information is to be collected; and a performance information collection unit for recognizing application software currently being executed by the computer and collecting performance information obtainable by the performance information obtainment unit based on the collection information corresponding to the recognized application software.

A recording medium according to the present invention, which is accessible by a computer capable of executing more than one application software, recording a program for accomplishing a performance information obtainment function for obtaining performance information of the computer; a collection information obtainment function for obtaining collection information, which is prepared by the unit of the application software, indicating a timing at which the performance information is to be collected; and a performance information collection function for recognizing application software currently being executed by the computer and collecting performance information obtainable by the performance information obtainment function based on collection information corresponding to the recognized application software.

The present invention is contrived to prepare, by the unit of application software, collection information indicating a timing at which performance information of a computer capable of executing more than one application software (simply "application" hereinafter) is to be collected, and collect the performance information based on the collection information corresponding to the application currently being executed by the computer.

A resource required for executing an application is different with application. An execution frequency and an importance are different with application. Because of this, a preparation of collection information per application and a collection of performance information according to the collection information of an application which is currently being executed make it possible to collect the performance information at an appropriate timing suitable to the currently executed application.

A resource required for executing an application is different with content to be processed. A condition at the time of the execution is not always necessarily the same. A usage condition of a resource changes with the content to be processed and/or condition at the time of an execution. Consequently, the preparation of plural collection information per usage condition of a resource makes it possible to always appropriately respond to the content to be processed by executing an application and a condition at the time of the execution. The case of parallelly collecting performance information according to a predetermined fixed timing enables the collection of the performance information which can not be collected by a collection thereof according to an application.

BRIEF DESCRIPTION OF THE DRAWINGS

FIG. 2 is a chart describing a content of a collection policy group 14;

FIG. 4 is a flow chart of a process accomplished by an execution of an application performance collection program 12a.

DESCRIPTION OF THE PREFERRED EMBODIMENTS

The following is a detailed description of the preferred embodiment of the present invention by referring to the accompanying drawings.

Figure 1:
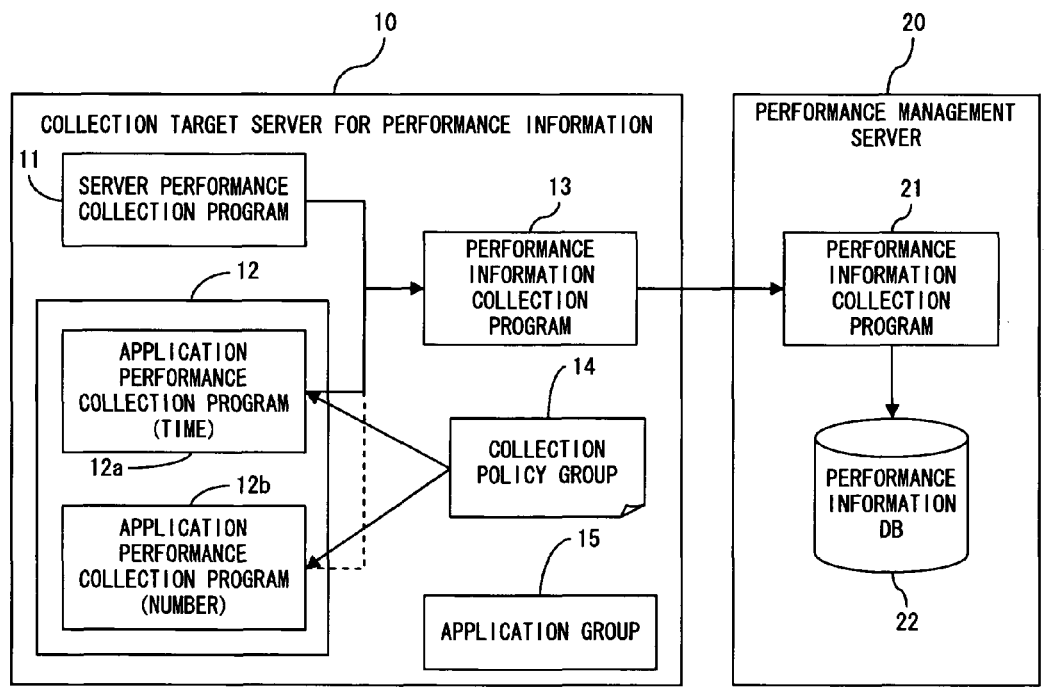
FIG. 1 is a diagram describing a configuration of a performance information collection system applied by a performance information collection apparatus according to the present embodiment.

FIG. 1 is a diagram describing a configuration of a performance information collection system applied by a performance information collection apparatus according to the present embodiment.

The performance information collection system comprises a collection target server (simply "target server" hereinafter) 10 for performance information and a performance management server 20 which is connected to the target server 10 by way of a telecommunication network as shown by FIG. 1.

The performance information collection apparatus (simply "collection apparatus" hereinafter) according to the present embodiment is applied in the form of being equipped on the target server 10.

The collection apparatus is implemented as one for collecting performance information of the equipped target server 10 and transmitting the collected performance information to the performance management server 20 which carries out the process of receiving the performance information transmitted from the target serve 10 and storing it in the store-use performance information database (DB) 22.

The target server 10 is connected to a telecommunication network which is connectable to a terminal apparatus. For a user utilizing a terminal apparatus, a service desired by the user is provided, via the telecommunication network, by executing one or more applications constituting an application group 15 in response to a condition. The collection apparatus is accomplished by the target server 10 executing a server performance collection program 11, an application performance collection program group 12 and a performance information collection program 13. A collection policy group 14 is data referred to at the time of the executions of the server performance collection program 11 and application performance collection program group 12.

Figure 5:
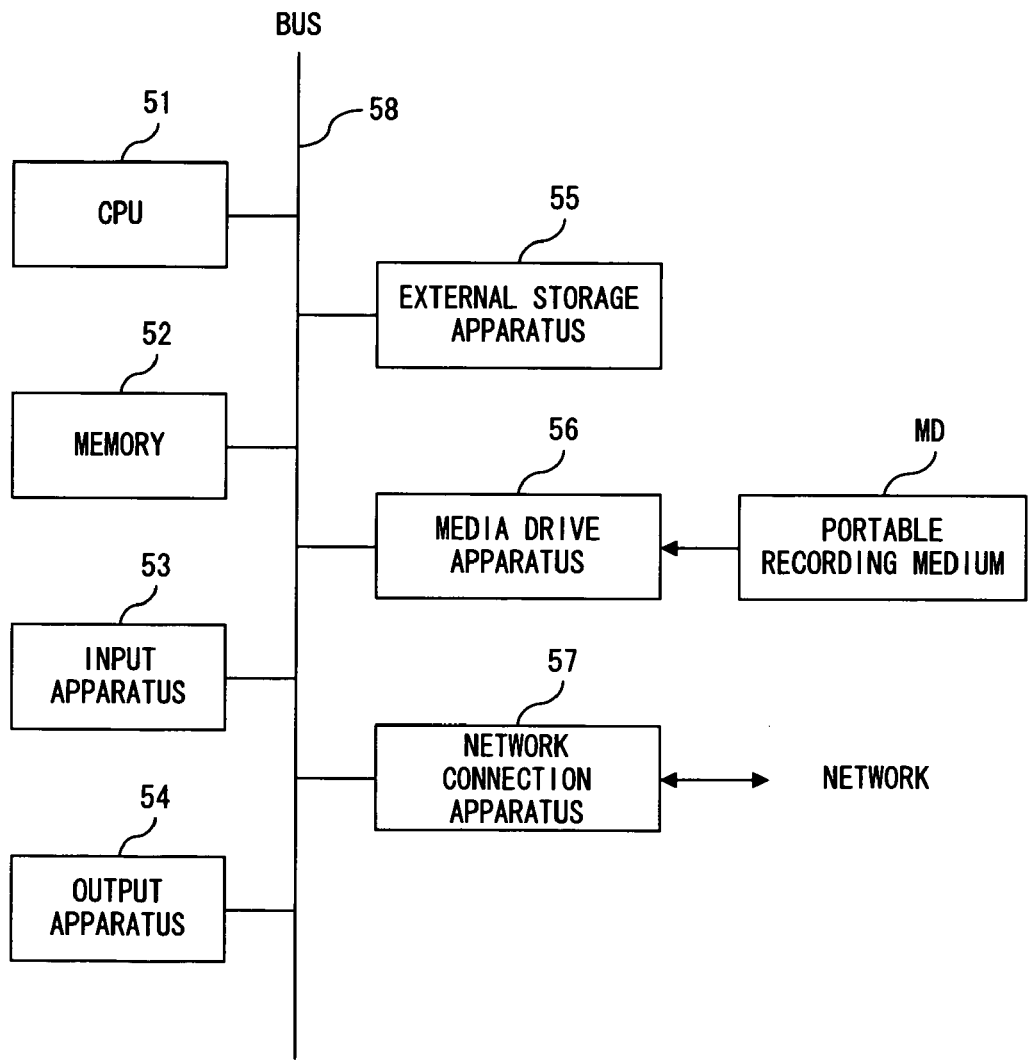
FIG. 5 is a diagram describing a hardware configuration of a computer usable as a collection target server 10 for performance information.

FIG. 5 is a diagram describing a hardware configuration of a computer usable as the above described target server 10. The next is a specific description regarding a configuration of a computer usable as the target server 10, prior to a detailed description relating to FIG. 1.

Such configured computer can be used as a performance management server 20.

The computer shown by FIG. 5 comprises a CPU 51, memory 52, an input apparatus 53, an output apparatus 54, an external storage apparatus 55, a storage media drive apparatus 56 and a network connection apparatus 57, with the aforementioned components being interconnected by a bus 58. The configuration shown by FIG. 5 is an example, in lieu of limiting the present invention.

The CPU 51 is disposed for controlling the entirety of the aforementioned computer. The memory 52 is memory such as RAM (random access memory) for temporarily storing a program or data stored by the external storage apparatus 55 (or a portable type recording medium MD) at the time of a program execution, data update, et cetera. The CPU 51 reads the program to the memory 52 and executes it, thereby controlling the entirety.

The input apparatus 53 is an apparatus connectable to an external input apparatus such as a key board and a mouse, or the one comprising these components, for example. It detects a user operation of such an external input apparatus and notifies the CPU 51 of the detection result.

The output apparatus 54 is an apparatus connectable to a display, for example, or the one comprising it. It outputs data transmitted as a result of a control of the CPU 51 to a display.

The network connection apparatus 57 is an apparatus for carrying out a telecommunication with other apparatuses by way of a telecommunication network such as LAN and Internet for example. The external storage apparatus 55 is a hard disk apparatus for example, and is mainly used for storing various data and programs.

The storage media drive apparatus 56 is an apparatus for accessing a portable type recording media MD such as an optical disk, a magnet optical disk, et cetera.

All of the above noted server performance collection program 11, application performance collection program group 12 and performance information collection program 13 are obtained by way of the network connection apparatus 57 or storage media drive apparatus 56, and then stored in the external storage apparatus 55. The collection policy group 14 is obtained by way of the input apparatus 53, network connection apparatus 57 or storage media drive apparatus 56, and stored in the external storage apparatus 55, for example. The collection apparatus according to the present embodiment is accomplished as a result of the CPU 51 executing these programs 11, 12 and 13. The collected performance information is transmitted to the performance management server 20. Accordingly, the collection apparatus comprises the CPU 51, memory 52, external storage apparatus 55, network connection apparatus 57 and bus 58 for example.

As described above, performance information is collected by referring to the collection policy group 14 which is now described in detail by referring to FIG. 2, before describing the respective programs 11 and 13, and a program group 12.

The collection policy group 14 is a group of information (i.e., collection information) defining a timing at which performance information is to be collected during the execution of an application, which is defined per application constituting the application group 15. As shown in FIG. 2, one or more conditional expressions defining a timing at which performance information is to be collected are described for each application. By this, the present embodiment is configured to collect performance information according to the collection policy corresponding to an application currently being executed by the target server 10.

Referring to FIG. 2, a description parenthesized by "[ ]", e.g., "[Application 1: Item A]", is one including identifier information indicating an application to which the collection policy corresponds and item information indicating a kind of performance information (i.e., a performance item) as a collection target. The "Application" described in front of a colon ":" corresponds to the identifier information and "Item A" described thereafter corresponds to the item information. The conditional expression defined for the application is described subsequently thereafter. The identifier information and item information express a partition of a collection policy, and therefore these are generically called "partition information" hereinafter for convenience.

Each conditional expression includes timing information indicating a collection timing at which the performance information is to be collected, and condition information indicating a condition under which the collection of the performance information according to the timing information is to be validated. A collection policy describing "[Application 1: Item A]" as partition information (simply noted as "collection policy for application 1" hereinafter; likewise for the others) for example describes "CPU<20%, samling interval=100 transactions" as a conditional expression. The conditional expression is disposed for designating a collection timing by the number of transactions (i.e., executions) of an application, with "samling interval=100 transactions" being timing information designating a collection of the performance information for every 100 times of executions of the application, while "CPU<20%" being condition information designating a condition of a CPU usage ratio of less than 20%.

A collection policy describing "[Application 2: Item A]" as partition information (i.e., a collection policy for application 2) describes "Disk<60%, samling interval=100 transactions" as a conditional expression for example. The "Disk<60%" described as condition information for the conditional expression designates a condition under which a usage area of an auxiliary storage apparatus or an external storage apparatus, which are accessible by the target server 10, is less than 60% of the entirety of an applicable storage area. The apparatus is the external storage apparatus 55 according to the configuration shown by FIG. 5.

A collection policy describing "[Application 3: Item A]" as partition information (i.e., a collection policy for application 3) describes "CPU<20%, samling interval=5 minutes" as a conditional expression for example. The "samling interval=5 minutes" described as condition information for the conditional expression designates a collection of the performance information at a five-minute interval. A collection policy describing "[Application 4: Item A]" as partition information (i.e., a collection policy for application 4) describes "the number of transactions<10 times/min., samling interval=1 transaction" as a conditional expression for example. The "the umber of transactions<10 times/min." described as condition information for the conditional expression designates a condition that the number of times of execution of the application 4 per minute is less than 10.

As described above, the configuration is such that the timing information (i.e., a sampling interval) is defined by the number of times of executing an application or by a time interval, while the condition information is defined by the kind of a focusing target, and by condition content to be satisfied by the target. Here, the kind of the target is called "performance item". A plurality of performance information can be described in the same conditional expression with the different performance items. The number of conditional expressions described in a collection policy may merely be one or more.

The present embodiment is configured to define the kinds of performance information as the collection targets for each collection policy. This is because one or more collection policies are only required for constituting a collection policy group 14. That is, for being able to respond to the case of preparing only one collection policy as the collection policy group 14. The kinds of target performance information may be defined by other than a collection policy.

The respective collection policies of the above described applications 1 through 4 are prepared by the assumption of applications and the concept as follows, for example.

The collection policy for the application 1 assumes an application which is executed constantly and continuously, and for which the importance of collecting the performance information is relatively low. The collection policy is so as to expand a sampling interval as the CPU usage rate becomes high. The reason is for suppressing an influence of collecting performance information.

The collection policy for the application 2 assumes an application which is executed periodically, and for which the importance of collecting the performance information is relatively high. Such applications include one for processing a DB for example. In such an application, a resource required by content to be processed greatly fluctuates at the time of execution. The fluctuation is greatly influenced by a data volume to be updated in a DB or a data volume to be added therein. Considering this, the collection policy is such as to collect the performance information at every time of executing an application when a ratio of a usage area becomes no less than 60%. This configuration enables a minute collection of the performance information, which becomes a material for investigation, when a load becomes high. The reason for the sampling interval being large in the case of the load being not high is that there is low necessity of collecting the performance information.

The collection policy for the application 3 assumes an application which is executed constantly and continuously, and for which a usage rate of a resource is relatively low. Such an application has a relatively low necessity for collecting its performance information and therefore the collection policy is such as to expand a sampling interval when the CPU usage rate becomes high, thereby suppressing an influence of collecting performance information. The sampling interval is made small when the CPU usage rate is low, thereby making it possible to grasp a fluctuation, or a trend, of a usage rate of a resource.

The collection policy for the application 4 assumes an application which is executed constantly, and is created for grasping a trend of an execution (i.e., a process) time of the application. Due to this, the collection policy is such as to expand the sampling interval in order to suppress a data volume of the performance information when the number of times of executions per unit length of time (e.g., one minute herein) increases.

As described above, a resource required for executing an application differs with application. Execution frequency and importance differ with application. Yet, the preparation of a collection policy for each application and the collection of performance information according to the collection policy of an application which is currently executed enable a collection of the performance information at an appropriate timing suitable to the currently executed application. This enables an appropriate collection of the performance information.

A resource required for executing an application also changes with process content. A preparation of a plurality of conditional expressions for a collection policy enables an suitable response, without a failure, to contents to be processed by an execution of an application and to condition at the time of an execution thereof. This makes it possible to collect the performance information more adequately.

The present embodiment is configured to prepare a collection policy for each application. However, among applications, a plurality of applications allowing the adoption of the same collection policy, as an outcome, can possibly exist. In the case of such plurality of applications existing, another collection policy may be allocated thereto. This means that a collection policy may only be prepared by the unit of application.

The next is a detailed description of each of the various programs shown in FIG. 1.

The server performance collection program 11 is disposed for referring to a collection policy group 14 and collecting performance information designated by a collection policy constituting the collection policy group 14.

Figure 3:
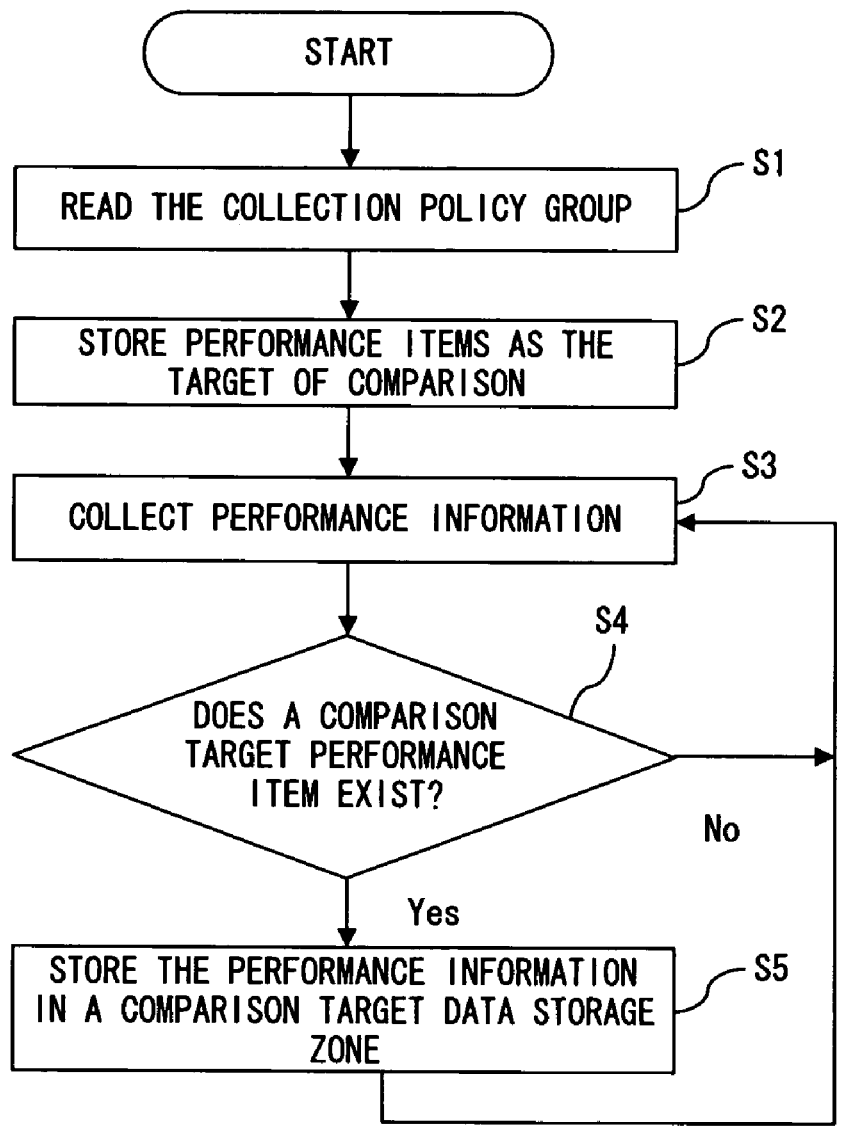
FIG. 3 is a flow chart of a process accomplished by an execution of a server performance collection program 11.

FIG. 3 is a flow chart of a process accomplished by an execution of the server performance collection program 11. The description now is of the process in detail by referring to FIG. 3. The process is accomplished by the CPU 51 shown in FIG. 5 executing the server performance collection program 11.

As the server performance collection program 11 is started, first, the program 11 reads the collection policy group 14 in the step S1. Then it extracts item information from the read collection policy group 14 and stores a performance item indicating the kind of performance information as the collection target in the subsequent step S2. Then the program 11 collects items of performance information respectively corresponding to predetermined performance items in the subsequently shifted step S3. The collection uses a known technique. The collection is followed by the step S4.

The program 11 then judges, in the step S4, whether or not some items corresponding to any of the performance items stored in the step 2 exist among the collected performance information. In such a case that none of the performance items of the collected performance information is designated by the collection policy, the judgment is "no", followed by returning to the above described step S3, waiting for a certain period of time and collecting performance information again. Otherwise, the judgment is "yes" to shift the process to the step S5 for storing the performance information designated by the collection policy in a comparison target data storage zone, followed by returning to the above described step S3. Then, after a certain period of time elapses, performance information is collected again.

As described above, the present embodiment is configured to collect performance information also at a predetermined fixed time interval for enabling the collection of the performance information which is difficult to cover by a collection thereof focusing on an application. The collection of performance information at a predetermined time interval makes it possible to increase a possibility of collecting the performance information at such timing.

The above-noted comparison target data storage zone, being a work zone secured in the external storage apparatus 55, for example, is used also for handing the collected performance information over to the performance information collection program 13 which in turn carries out a process of transmitting the performance information stored in the comparison target data storage zone to the performance management server 20. A performance information collection program 21 carried out by the performance management server 20 processes the performance information transmitted as described above and stores it in the performance information DB 22.

The application performance collection program group 12 is disposed for collecting performance information according to a collection policy corresponding to an application currently being executed by the target server 10. The collection policy is configured to designate a sampling interval by the number of transactions or a time interval as shown in FIG. 2.

The present embodiment is configured to prepare two application performance collection programs 12a and 12b as an application performance collection program group 12. The application performance collection program 12a is disposed for a collection policy (i.e., a conditional expression) designating a sampling interval by a time interval, while the application performance collection program 12b is disposed for a collection policy (i.e., a conditional expression) designating the interval by the number of transactions.

FIG. 4 is a flow chart of a process accomplished by an execution of the application performance collection program 12a. Here, the process is described in detail by referring to FIG. 4. The process is accomplished by the CPU shown in FIG. 5 executing the application performance collection program 12a.

As it is started, the application performance collection program 12a first reads a collection policy group 14 in the step S11. the program 12a extracts a conditional expression from the read collection policy group 14 for example and stores a sampling interval for each conditional expression in the subsequent step S12. It collects the performance information designated by the collection policy of the currently executed application in the next subsequent step S13, followed by proceeding to the step S14.

The conditional expressions constituting a collection policy are configured to include condition information and timing information. The condition information constituting a conditional expression expresses a condition under which the conditional expression is to be targeted by way of the contents of performance information of the designated performance items. The program 12a extracts condition information of each conditional expression from the collection policy of the currently executed application and refers to the actually obtained performance information expressed by the condition information in the step S14. It judges whether or not the referred performance information agrees with a condition for changing a sampling interval in the subsequent step S15. If the performance information is in agreement with the change condition, hence the judgment is "yes", followed by changing the sampling intervals and returning to the above described step S13. Otherwise, that is, no change of the sampling interval being required, the judgment is "no" to return to the step S13 without carrying out a process of other steps.

If a conditional expression possessing the condition information which is identical with the content of the current performance information is different from one before this event, the change condition becomes identical. The kind of a sampling interval is different with collection policy (i.e., conditional expression). Consequently, the change condition may become identical by changing the application being executed.

The collection of performance information in the step S13 is carried out according to the sampling interval designated at the time. Before the sampling interval elapses, a change of application can possibly occur. Because of this, the configuration is such as to designate a sampling interval associated with an application change by monitoring the currently executed application in the process of the step S13. Consequently, a sampling interval is changed in the step S16 if the change condition becomes identical by making a conditional expression different from prior events as the target. Since there is a possibility of changing applications, the measurement of time for judging whether or not the sampling interval has elapsed is carried out per application.

The performance information collected in the step S13 is stored in a storage zone which is secured separately from the comparison target data storage zone for example, thereby handing the collected performance information over to the performance information collection program 13 by way of the separately secured storage zone.

A process content accomplished by carrying out the application performance collection program 12b is basically the same as shown by FIG. 4, and therefore a detailed description thereof is omitted here. Except that the configuration is such as to count the number of execution of an application in the step S13 in order to collect performance information at a sampling interval designated by the number of executions of an application. Since there is a possibility of changing applications, the counting is performed per application. The number of executions per unit length of time is calculated by using a result of such counting. The counting of the number of executions and the calculation of the number of executions per unit length of time are carried out in the step S13 also at the time of executing the application performance collection program 12a.

The startup and ending of the server performance collection program 11 and application performance collection program group 12 are carried out for example by the performance information collection program 13 which carries out these operations according to a request from the performance information collection program 21 for example. This enables the performance management server 20 to instruct whether or not to make a collection of performance information carried out.

Note that the present embodiment is configured to prepare the two application performance collection programs 12a and 12b as the programs for collecting performance information according to the currently executed application, the number of the programs, however, is not particularly important. That is, the number may be one, or three or greater. As for the collection policy group 14, the present embodiment is configured to prepare it separately from the application performance collection programs 12a and 12b so as to make an easy response to a change of focused applications, et cetera, the collection policy group 14, however, may be comprised by a program as initial setup data, et cetera, in a case that there is no need to consider a change of applications.

What is claimed is:

1. A performance information collection method for collecting performance information of a computer capable of executing more than one application software, comprising:
   preparing collection information, by a unit of the application software, indicating a timing at which the performance information is to be collected; and
   collecting the performance information using collection information corresponding to application software currently being executed by the computer; wherein
   said collection information prepared by the unit of application software dynamically changes a timing for collecting said performance information according to a usage condition of a resource by preparing one or more pieces of collection information per usage condition of the resource possessed by said computer.

2. The performance information collection method according to claim 1,
   also carrying out a collection of said performance information according to a predetermined fixed timing.

3. A performance information collection apparatus for collecting performance information of a computer capable of executing more than one application software, comprising:
   a performance information obtainment unit to obtain the performance information;
   a collection information obtainment unit to obtain collection information, which is prepared by a unit of the application software, indicating a timing at which the performance information is to be collected; and
   a performance information collection unit to recognize application software currently being executed by the computer and to collect performance information obtainable by the performance information obtainment unit using the collection information corresponding to the recognized application software; wherein
   said performance information collection unit dynamically changes a timing for collecting said performance information according to a usage condition of a resource in the case that plural collection information of said recognized application software have been prepared per usage condition of the resource possessed by said computer.

4. A recording medium, which is accessible by a computer capable of executing more than one application software, recording a program for accomplishing:
   a performance information obtainment function to obtain performance information of the computer;
   a collection information obtainment function to obtain collection information, which is prepared by a unit of the application software, indicating a timing at which the performance information is to be collected; and a performance information collection function to recognize application software currently being executed by the computer and collecting performance information obtainable by the performance information obtainment function based on collection information corresponding to the recognized application software; wherein said performance information collection function dynamically changes a timing for collecting said performance information according to a usage condition of a resource in the case that plural collection information of kinds of said recognized application software have been prepared per usage condition of the resource possessed by said computer.

5. The recording medium according to claim 4, wherein said performance information collection function also carries out a collection of said performance information according to a predetermined fixed timing.

* * * * *